United States Patent [19]  
Miyauchi

[11] Patent Number: 5,148,308  
[45] Date of Patent: Sep. 15, 1992

[54] REAL IMAGE TYPE VARI-FOCAL VIEWFINDER
[75] Inventor: Yuji Miyauchi, Kanagawa, Japan
[73] Assignee: Olympus Optical Co., Ltd., Tokyo, Japan
[21] Appl. No.: 558,314
[22] Filed: Jul. 26, 1990
[30] Foreign Application Priority Data Jul. 26, 1989 [JP] Japan .................................. 1-195409

[51] Int. Cl.⁵ ..................... G02B 23/14; G02B 15/14
[52] U.S. Cl. .................................. 359/432; 359/433; 359/689; 359/557
[58] Field of Search ............. 350/410, 432, 436, 423, 350/422, 571; 359/643, 689, 708, 720, 672, 676, 433, 432, 557

[56] References Cited  
U.S. PATENT DOCUMENTS 4,842,395 6/1989 Sato et al. ..................... 350/423  
4,887,109 12/1989 Fujita et al. ..................... 350/423

FOREIGN PATENT DOCUMENTS 63-191326 12/1988 Japan .  
63-191327 12/1988 Japan .  
1-166024 6/1989 Japan .  
1-197727 8/1989 Japan .

Primary Examiner—Bruce Y. Arnold  
Assistant Examiner—David R. Parsons  
Attorney, Agent, or Firm—Cushman, Darby & Cushman

[57] ABSTRACT

A real image type vari-focal viewfinder comprising an objective lens system consisting of a plurality of lens components and functioning to form a real image, and an eyepiece lens system, adapted so as to vary focal length thereof by moving at least one of the lens units arranged in the objective lens system, and adapted so as to correct parallax by placing said at least one of the lens units or one of the lens components arranged in said at least one of the lens units in a condition eccentric or inclined with regard to the optical axis.

10 Claims, 3 Drawing Sheets

REAL IMAGE TYPE VARI-FOCAL VIEWFINDER

BACKGROUND OF THE INVENTION a) Field of the Invention

The present invention relates to a real image type vari-focal viewfinder for forming the image of air with rays which have not passed through a photographing lens and to be used in cameras equipped with photographing lenses capable of changing focal lengths thereof for focusing within broad ranges of object distances from infinite to very short distances.

b) Description of the Prior Art

The conventional real image type viewfinders adopts, as a means for helping photographers correct parallax, a fixed index indicating a photographing range for photographing objects located at short distances, or a visual field frame which is arranged at an intermediate image position and moved for photographing objects located at short distances.

The former type of conventional viewfinder is always visible, thereby constituting a hindrance to photographers when objects to be photographed are not located at short distances. Further, when the parallax is varied by zooming the photographic lenses, it is difficult to move the fixed index and the visual field frame in correspondence to the variation of the parallax.

As exemplified by the viewfinder disclosed by Japanese Patent Kokai Publication No. Hei 1-197727, there are known the viewfinders adapted so as to correct diopter and parallax at the same time by moving a lens which has an imaging function but no vari-focal function simultaneously in two directions along and perpendicular to the optical axis.

Due to the general requirement to enhance height of the effective rays on the intermediate imaging surface, it is obliged to prolong effective diameters of viewfinder optical systems while sacrificing compact designs of the viewfinders and it is difficult to correct aberrations in the optical systems. Further, since lens barrels are moved on the intermediate image surfaces, dust is floating within ranges where diopters are matched and adheres to lenses at high possibilities, thereby hindering clear sight of images within the visual fields.

The viewfinder disclosed by Japanese Patent Kokai Publication No. Hei 1-197727 is a real image type vari-focal viewfinder adapted so as to correct diopter and parallax by moving the lens which is kept fixed during variation of focal length, etc. This vari-focal viewfinder requires, in addition to the mechanism for varying focal length of the viewfinder, an interlocking mechanism for moving a lens other than the lens moved for variation of focal length, thereby having a very complicated structure and requiring a high manufacturing cost.

SUMMARY OF THE INVENTION

A primary object of the present invention is to provide a compact real image type vari-focal viewfinder which has very simple structure, provides a legible visual field and permits correcting parallax.

The real image type vari-focal viewfinder is adapted so as to form a real image by an objective lens system whose focal length is changed by moving at least one lens component along the optical axis and correct parallax by placing said at least one lens component in a position eccentric with regard to the optical axis.

Speaking concretely, the real image type vari-focal viewfinder according to the present invention is adapted so as to correct parallax by placing a lens unit which is arranged on the object side of the intermediate image surface and moved for variation of focal length or at least one lens component of said lens unit in a position eccentric with regard to the optical axis of the viewfinder so as to displace location of the image formed on the intermediate image surface.

When the lens unit which is moved for variation of focal length or at least one lens component arranged in said lens unit is placed in the position eccentric with regard to the optical axis, the mechanism for the eccentrical movement and the interlocking mechanism have structures simpler than those of such mechanisms required for eccentrically moving the lens unit or lens component which is kept fixed during variation of focal length. Accordingly, the present invention permits reducing the number of the parts of the mechanism for correction of parallax and designing this mechanism compacter.

Further, the vari-focal viewfinder according to the present invention is adapted so as to prevent the effective rays from being influenced by the eyepiece lens thereof arranged on the eye side of the intermediate image surface.

Furthermore, the vari-focal viewfinder according to the present invention permits setting degree of parallax correction so as to be matched with the field angle to be obtained after variation of focal length of the viewfinder optical system by varying, simultaneously with the variation of focal length, degree of eccentricity of the lens unit or the lens component which is made eccentric for the parallax correction or by varying focal length of the viewfinder optical system while a specific lens unit or the lens component is kept eccentric at a definite degree.

When it is desired to correct parallax in a large amount or it is impossible to make a lens unit or a lens component eccentric at a high degree, the vari-focal viewfinder according to the present invention permits correcting parallax by combining eccentricities of a plurality of lens units or a plurality of lens components composing said lens units. Even in such a case, the mechanism for eccentricity has a relatively simple structure.

DETAILED DESCRIPTION OF THE PREFERRED EMBODIMENTS

Figure 1:
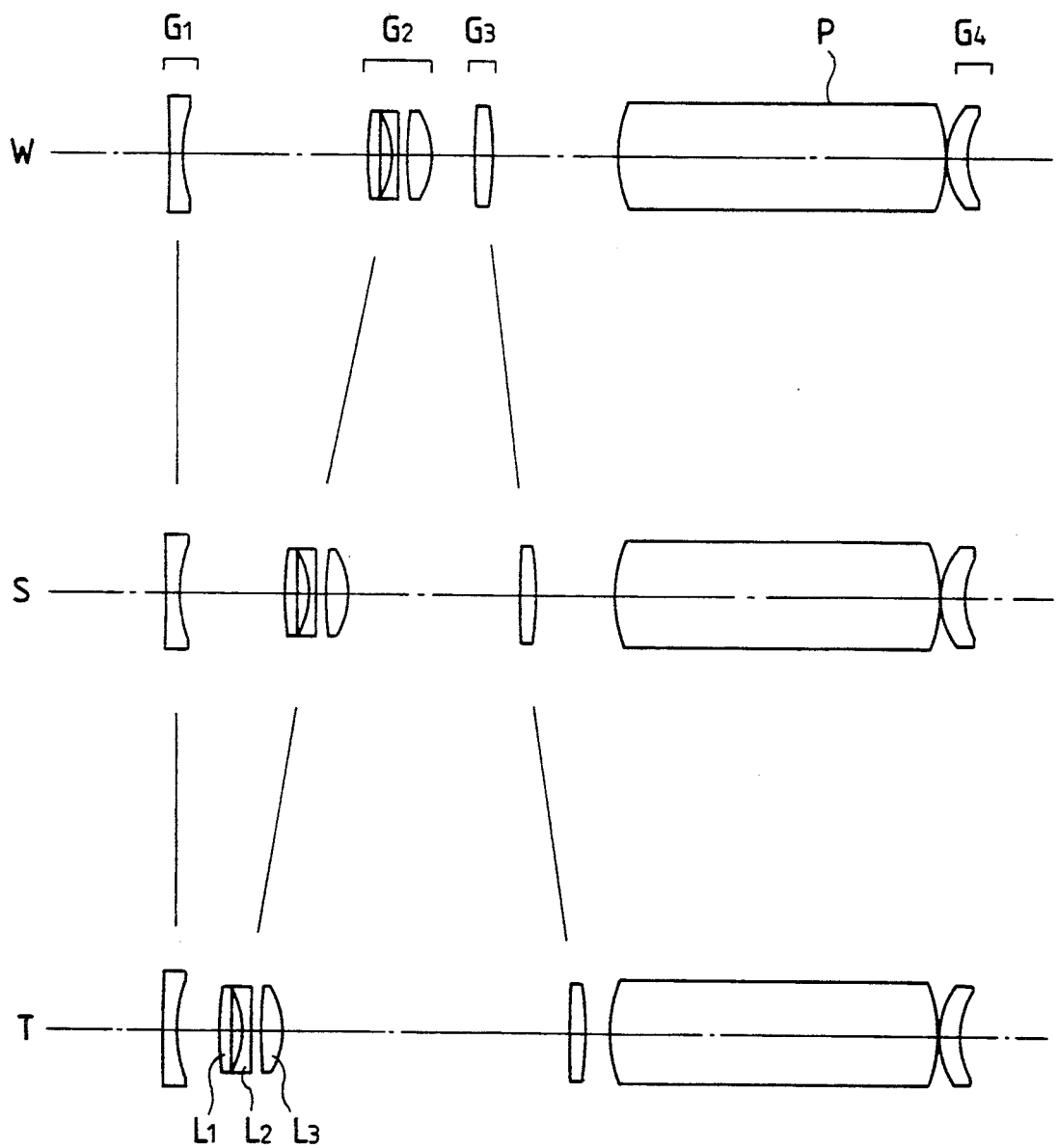
FIG. 1 and FIG. 2 show sectional views illustrating compositions of Embodiments 1 and 2 of the real image type vari-focal viewfinder according to the present invention.

The Embodiment 1 has the composition illustrated in FIG. 1 wherein the viewfinder optical system comprises, in the order from the object side, an objective lens system consisting of a first lens unit $G_1$ having a negative refractive power, a second lens unit $G_2$ having a positive refractive power and a third lens unit $G_3$ having a positive refractive power, a porro prism P having spherical surfaces on both the incidence side and the emergence side, and an eyepiece lens system $G_4$, and is adapted so as to form an intermediate image on the incidence end surface of the porro prism P. Designed as movable lens units in this optical system are the second lens unit $G_2$ which is composed of lens components $L_1$, $L_2$ and $L_3$ arranged in the order from the object side, and the third lens unit $G_3$.

The Embodiment 1 has the numerical data listed below:

$r_1 = -193.9146$
  $d_1 = 1.5593$   $n_1 = 1.49216$   $\nu_1 = 57.50$
$r_2 = 19.5937$
  $d_2 = D_1$ (variable)
$r_3 = 26.9942$
  $d_3 = 2.0006$   $n_2 = 1.72916$   $\nu_2 = 54.68$
$r_4 = -70.3255$
  $d_4 = 1.2097$
$r_5 = -13.2007$
  $d_5 = 1.3403$   $n_3 = 1.80518$   $\nu_3 = 25.43$
$r_6 = -56.3597$
  $d_6 = 1.0002$
$r_7 = 60.6809$
  $d_7 = 3.0002$   $n_4 = 1.49216$   $\nu_4 = 57.50$
$r_8 = -11.1119$ (aspherical surface)
  $d_8 = D_2$ (variable)
$r_9 = 188.4302$
  $d_9 = 2.4997$   $n_5 = 1.49216$   $\nu_5 = 57.50$
$r_{10} = -27.1673$ (aspherical surface)
  $d_{10} = D_3$ (variable)
$r_{11} = 22.6270$
  $d_{11} = 43.4000$   $n_6 = 1.49216$   $\nu_6 = 57.50$
$r_{12} = -22.6270$
  $d_{12} = 0.2000$
$r_{13} = 9.9775$ (aspherical surface)
  $d_{13} = 2.7600$   $n_7 = 1.49216$   $\nu_7 = 57.50$
$r_{14} = 12.3320$
  $d_{14} = 16.3000$
$r_{15}$ eye point aspherical surface coefficient
(8th surface)
$E = 0.99485 \times 10^{-4}$,   $F = -0.27888 \times 10^{-6}$
$G = 0.91165 \times 10^{-8}$
(10th surface)
$E = 0.30403 \times 10^{-4}$,   $F = 0.83713 \times 10^{-6}$
$G = -0.47674 \times 10^{-7}$,   $H = 0.78973 \times 10^{-9}$
(13th surface)
$E = -0.44249 \times 10^{-4}$,   $F = -0.36906 \times 10^{-6}$
$G = -0.65538 \times 10^{-8}$

|   | wide position | intermediate focal length | tele position |
|---|---|---|---|
| $D_1$ | 24.353 | 13.981 | 5.753 |
| $D_2$ | 6.156 | 23.118 | 38.638 |
| $D_3$ | 16.881 | 10.291 | 2.999 | wherein the reference symbols $r_1, r_2, \ldots$ represent radii of curvature on the surfaces of the respective lens components, the reference symbols $d_1, d_2, \ldots$ designate thicknesses of the respective lens components and the airspaces reserved therebetween, the reference symbols $n_1, n_2, \ldots$ denote refractive indices of the respective lens components, and the reference symbols $\nu_1, \nu_2, \ldots$ represent Abbe's numbers of the respective lens components.

In the Embodiment 1, the eighth, tenth and thirteenth lens surfaces are designed as aspherical surfaces. When the direction of the optical axis is taken as the abscissa x and the direction perpendicular to the optical axis is taken as the ordinate s, the shapes of these aspherical surfaces are expressed by the following formula:

$$x = \frac{Cs^2}{1 + \sqrt{1 - C^2 s^2}} + Es^4 + Fs^6 + Gs^8 + Hs^{10}$$

wherein the reference symbol C represents the radius of curvature of the reference sphere of the aspherical surface of interest, and the reference symbols E, F, G and H designate the aspherical surface coefficients.

The viewfinder optical system preferred as the Embodiment 1 is adapted so as to correct parallax by moving any one of the lens components $L_1$, $L_2$ and $L_3$ arranged in the second lens unit $G_2$, or the second lens unit as a whole or the third lens unit $G_3$ to an eccentric position. In this case, variations (deg.) of the optical axes of the rays incident on the viewfinder per unit eccentricity degree ($\epsilon = 10'$ and $\delta = 0.1$ mm) are as listed as (1) through (5) respectively in the following table (A):

TABLE (A)

|   | wide position | | intermediate focal length | | tele position | |
|---|---|---|---|---|---|---|
|   | $\epsilon = 10'$ | $\delta = 0.1$ mm | $\epsilon = 10'$ | $\delta = 0.1$ mm | $\epsilon = 10'$ | $\delta = 0.1$ mm |
| (1) lens component $L_1$ | 0.0083 | 0.3548 | 0.0063 | 0.2979 | 0.0046 | 0.2493 |
| (2) lens component $L_2$ | −0.0009 | −0.4238 | −0.0013 | −0.3584 | −0.0016 | −0.3022 |
| (3) lens component $L_3$ | 0.0343 | 0.5173 | 0.0286 | 0.4435 | 0.0237 | 0.3794 |
| (4) 2nd lens unit $G_2$ | 0.0857 | 0.4483 | 0.0717 | 0.3830 | 0.0598 | 0.3265 |
| (5) 3rd lens unit $G_3$ | 0.0176 | 0.1577 | 0.0094 | 0.0602 | 0.0047 | 0.0105 |

Figure 3:
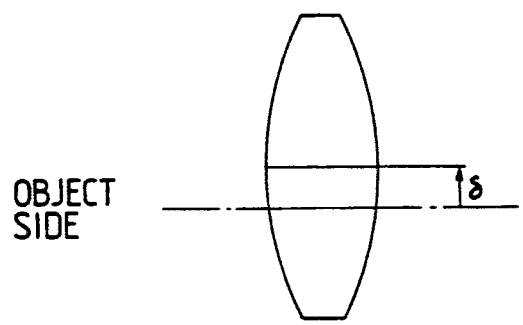
FIG. 3 shows a sectional view illustrating a lens component set in an eccentric condition.
Figure 4:
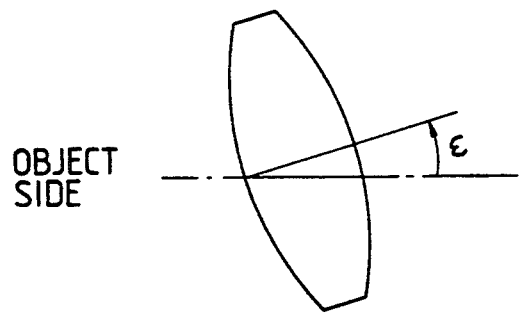
FIG. 4 shows a sectional view illustrating the lens component set in another eccentric condition.
Figure 5:
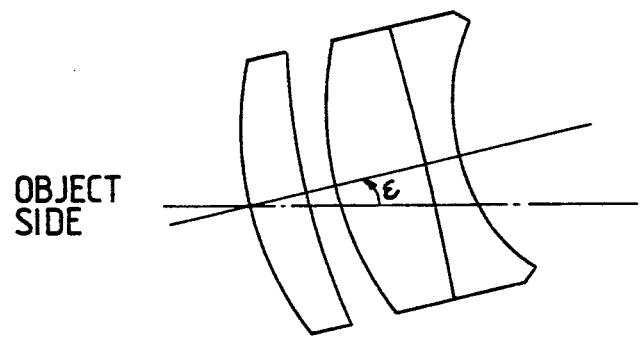
FIG. 5 shows a sectional view illustrating a lens unit set in an eccentric condition.

For the values listed in the above table, the directions shown in FIG. 3 (shift of the lens component or lens unit), in FIG. 4 (tilt of the lens component) and in FIG. 5 (tilt of the lens unit) are taken as positive, and the clockwise rotation around the optical axis is taken as positive for the variations of the optical axes of the incident rays.

On the basis of the values listed in (1) through (5) of the above table, it is possible to correct parallax by selecting an optional lens component or lens unit which cannot cause mechanical interference with the neighboring lens component or lens unit.

The variation per unit eccentricity degree caused by moving the third lens unit $G_3$ in the tele position, listed in (5) of the above table, is lower than any of those caused by moving the other lens components or lens units. Accordingly, when parallax is corrected by placing the third lens unit $G_3$ in an eccentric condition, eccentricity degree is the highest, thereby making it necessary to prolong the effective diameter of the viewfinder optical system contrary to the object of the present invention to provide a compact viewfinder optical system.

For the reason described above, it is desirable in the Embodiment 1, especially at the tele position thereof, to correct parallax by placing the second lens unit $G_2$, or the lens components $L_1$, $L_2$ or $L_3$ arranged therein in the eccentric condition.

Figure 2:
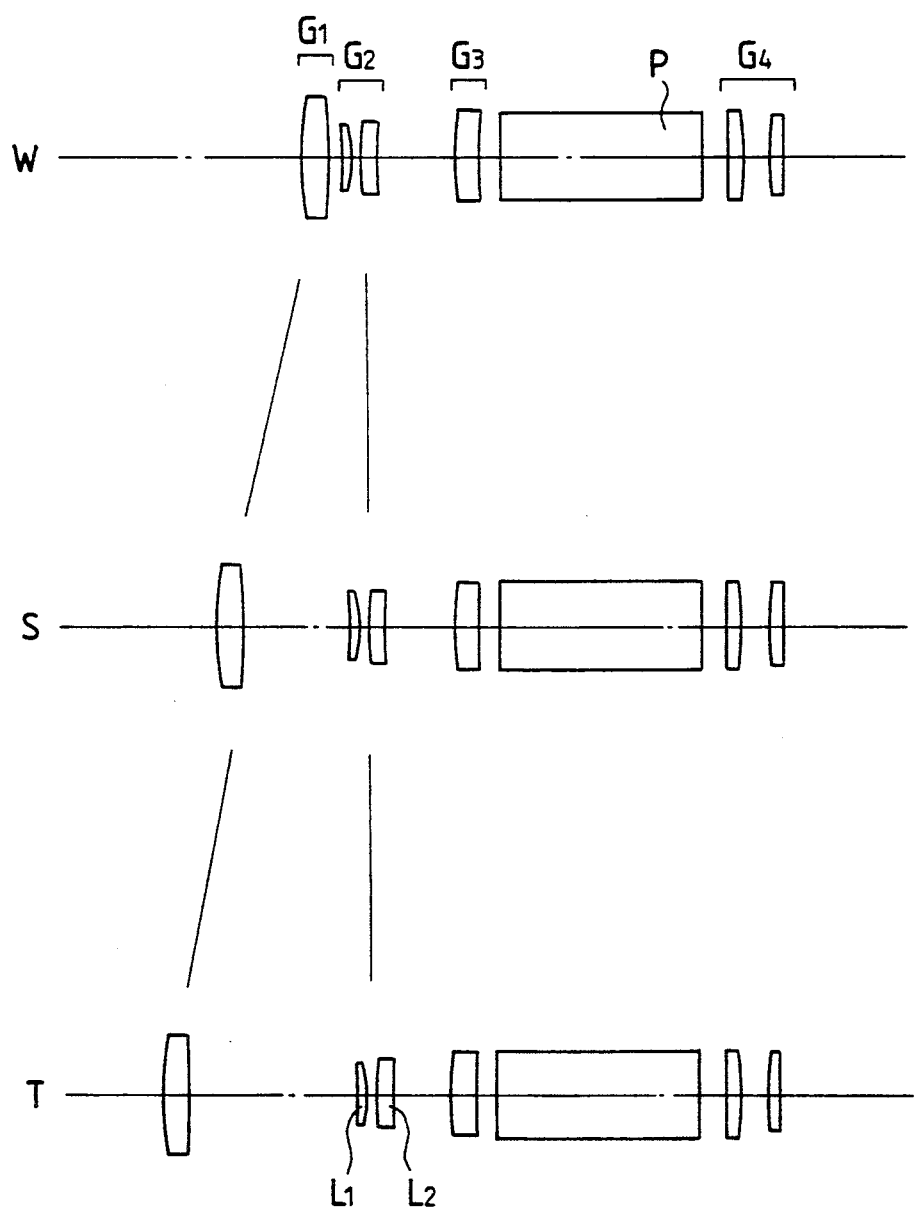

The Embodiment 2 has the composition illustrated in FIG. 2 wherein the vari-focal viewfinder optical system comprises, in the order from the object side, an objective lens system consisting of a first lens unit $G_1$, a second lens unit $G_2$ and a third lens unit $G_3$, a porro prism P and an eyepiece lens system $G_4$, and is adapted so as to form an intermediate image in the vicinity of the third lens unit $G_3$. Further, the Embodiment 2 selects, as the lens units to be moved for variation of focal length, the first lens unit $G_1$ and the second lens unit $G_2$ which is composed of lens components $L_1$ and $L_2$.

The Embodiment 2 has the following numerical data:

| | | | |
|---|---|---|---|
| $r_1 = 27.9360$ | | | |
| | $d_1 = 3.6000$ | $n_1 = 1.49216$ | $\nu_1 = 57.50$ |
| $r_2 = -124.9800$ | | | |
| | $d_2 = D_1$ (variable) | | |
| $r_3 = -82.0257$ | | | |
| | $d_3 = 1.22$ | $n_2 = 1.69680$ | $\nu_2 = 55.52$ |
| $r_4 = -15.8138$ | | | |
| | $d_4 = 0.9600$ | | |
| $r_5 = 22.2120$ | | | |
| | $d_5 = 2.4000$ | $n_3 = 1.69680$ | $\nu_3 = 55.52$ |
| $r_6 = 93.3960$ | | | |
| | $d_6 = D_2$ (variable) | | |
| $r_7 = 18.6000$ | | | |
| | $d_7 = 3.6000$ | $n_4 = 1.77250$ | $\nu_4 = 49.66$ |
| $r_8 = -5262.5760$ | | | |
| | $d_8 = 2.5200$ | | |
| $r_9 = \infty$ | | | |
| | $d_9 = 25.38$ | $n_5 = 1.60342$ | $\nu_5 = 38.01$ |
| $r_{10} = \infty$ | | | |
| | $d_{10} = 3.0000$ | | |
| $r_{11} = \infty$ | | | |
| | $d_{11} = 1.8000$ | $n_6 = 1.62041$ | $\nu_6 = 60.27$ |
| $r_{12} = -31.4280$ | | | |
| | $d_{12} = 3.2400$ | | |
| $r_{13} = 31.4280$ | | | |
| | $d_{13} = 1.8000$ | $n_7 = 1.62041$ | $\nu_7 = 60.27$ |
| $r_{14} = \infty$ | | | |
| | $d_{14} = 14.4000$ | | |
| $r_{15}$ eye point | | | |

| | wide position | intermediate focal length | tele position |
|---|---|---|---|
| $D_1$ | 1.871 | 13.613 | 21.418 |
| $D_2$ | 9.625 | 8.428 | 7.235 |

The Embodiment 2 is adapted so as to correct parallax by placing into an eccentric condition the lens component $L_1$ or lens component $L_2$ arranged in the second lens unit $G_2$, or the first lens unit $G_1$ or the second lens unit $G_2$ as a whole. The variations of the optical axes of the rays per unit eccentricity degree ($\epsilon = 10'$ and $\delta = 0.1$ mm) to be caused by moving the lens components or the lens units are listed in (1) through (4) of the following table (B) wherein the directions of eccentricity are taken as the same as those in the Embodiment 1:

TABLE (B)

| | wide position | | intermediate focal length | | tele position | |
|---|---|---|---|---|---|---|
| | $\epsilon = 10'$ | $\delta = 0.1$ mm | $\epsilon = 10'$ | $\delta = 0.1$ mm | $\delta = 10'$ | $\delta = 0.1$ mm |
| (1) lens component $L_1$ | 0.0092 | 0.1803 | 0.0071 | 0.1295 | 0.0057 | 0.0957 |
| (2) lens component $L_2$ | 0.0110 | 0.1193 | 0.0089 | 0.0854 | 0.0076 | 0.0628 |
| (3) 1st lens unit $G_1$ | 0.0060 | 0.1208 | 0.0060 | 0.1226 | 0.0059 | 0.1233 |
| (4) 2nd lens unit $G_2$ | 0.0278 | 0.2995 | 0.0215 | 0.2149 | 0.0173 | 0.1586 |

In the Embodiment 2 also, it is possible to correct parallax by selecting an optional lens unit or lens component on the basis of the values listed in (1) through (4) of the table (B).

As is understood from the foregoing description, the real image type vari-focal viewfinder according to the present invention has a simple composition, provides a legible visual field and permits correcting parallax sufficiently.

I claim:

1. A real image type vari-focal viewfinder comprising:
    an objective lens system for forming a real image of an object, said objective lens system including a plurality of lens units,
    an image erecting lens system for erecting said real image, and
    an eyepiece lens system for permitting observation of said erect image,
    wherein at least one of the lens units of said objective lens system is movable along the optical axis so that focal length of vari-focal viewfinder is varied, and
    wherein parallax is corrected by shifting said at least one movable lens unit.

2. A real image type vari-focal viewfinder comprising:
    an objective lens system for forming a real image of an object, said objective lens system including a plurality of lens units,
    an image erecting lens system for erecting said real image, and
    an eyepiece lens system for observing said erect image,
    wherein focal length of said vari-focal viewfinder is varied by moving at least one of the lens units of said objective lens system along the optical axis, and
    wherein parallax is corrected by tilting said at least one movable lens unit.

3. A real image type vari-focal viewfinder according to claim 1 or 2 wherein said objective lens system consists, in the order from the object side, of a first lens unit having a negative refractive power, a second lens unit having a positive refractive power and a third lens unit having a positive refractive power, said second lens unit and said third lens unit are designed as movable lens units, and parallax is corrected by moving said second lens unit.

4. A real image type vari-focal viewfinder according to claim 1 or 2 wherein said objective lens system consists, in the order from the object side, of a first lens unit having a negative refractive power, a second lens unit having a positive refractive power and a third lens unit having a positive refractive power, said second lens unit and said third lens unit are designed as movable lens units, and parallax is corrected by moving said third lens unit.

5. A real image type vari-focal viewfinder according to claim 1 or 2 wherein said objective lens system consists of a first lens unit, a second lens unit and a third lens unit all having positive refractive powers, said first lens unit and said second lens unit are designed as movable lens units, and parallax is corrected by moving said first lens unit.

6. A real image type vari-focal viewfinder according to claim 1 or 2 wherein said objective lens system consists of a first lens unit, a second lens unit and a third lens unit all having positive refractive powers, said first lens unit and said second lens unit are designed as movable lens units, and parallax is corrected by moving said second lens unit.

7. A real image type vari-focal viewfinder according to claim 1 or 2 wherein said objective lens system consists of a first lens unit, a second lens unit and a third lens unit all having positive refractive powers, said second lens unit is composed of two lens components, said first lens unit and said second lens unit are designed as movable lens units, and parallax is corrected by moving either of the lens units arranged in said second lens unit.

8. A real image type vari-focal viewfinder comprising:
an objective lens system for forming a real image of an object, said objective lens system including a plurality of lens units,
an image erecting lens system for erecting said real image, and
an eyepiece lens system for observing said erect image,
wherein focal length of said vari-focal viewfinder is varied by moving at least one of the lens units of said objective lens system along the optical axis,
wherein said at least one movable lens unit being composed of a plurality of lens components, and
wherein parallax is corrected by shifting one of said lens components.

9. A real image type vari-focal viewfinder comprising:
an objective lens system for forming a real image of an object, said objective lens unit including a plurality of lens units,
an image erecting lens system for erecting said real image, and
an eyepiece lens system for observing said erect image,
wherein focal length of said vari-focal viewfinder is varied by moving at least one of the lens units of said objective lens system along the optical axis,
wherein said at least one lens unit consists of a plurality of lens components, and
wherein parallax is corrected by inclining one of said lens components.

10. A real image type vari-focal viewfinder according to claim 8 or 9 wherein said objective lens system consists, in the order from the object side, of a first lens unit having a negative refractive power, a second lens unit having a positive refractive power and a third lens unit having a positive refractive power, said second lens unit is composed of three lens components, said second lens unit and said third lens unit are designed as movable lens units, and parallax is corrected by moving one of the lens units arranged in said second lens unit.

* * * * *